United States Patent
Iwatsu et al.

(10) Patent No.: US 9,829,997 B2
(45) Date of Patent: Nov. 28, 2017

(54) HEAD-MOUNTED DISPLAY SYSTEM, HEAD-MOUNTED DISPLAY, AND HEAD-MOUNTED DISPLAY CONTROL PROGRAM

(71) Applicant: Sony Corporation, Tokyo (JP)

(72) Inventors: Takeshi Iwatsu, Kanagawa (JP); Hirotaka Ishikawa, Kanagawa (JP); Kenji Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 8 days.

(21) Appl. No.: 14/401,040

(22) PCT Filed: Jan. 15, 2014

(86) PCT No.: PCT/JP2014/000140
§ 371 (c)(1),
(2) Date: Nov. 13, 2014

(87) PCT Pub. No.: WO2014/129105
PCT Pub. Date: Aug. 28, 2014

(65) Prior Publication Data
US 2015/0138081 A1     May 21, 2015

(30) Foreign Application Priority Data
Feb. 22, 2013    (JP) .................... 2013-033077

(51) Int. Cl.
G09G 5/00        (2006.01)
G06F 3/0346      (2013.01)
(Continued)

(52) U.S. Cl.
CPC ......... *G06F 3/0346* (2013.01); *G02B 27/017* (2013.01); *G06F 3/011* (2013.01);
(Continued)

(58) Field of Classification Search
CPC ........ G06F 3/0346; G06F 3/011; G06F 3/012; G06F 3/0484; G06F 3/04842;
(Continued)

(56) References Cited

U.S. PATENT DOCUMENTS 5,977,935 A * 11/1999 Yasukawa ............ G02B 27/017
340/980
6,061,064 A *  5/2000 Reichlen ................ G06F 3/011
345/418

(Continued)

FOREIGN PATENT DOCUMENTS

JP    H07271546     10/1995
JP    2004-233909    8/2004
(Continued)

OTHER PUBLICATIONS

International Search Report issued in connection with International Patent Application No. PCT/JP2014/000140, dated Apr. 22, 2014. (1 page).

(Continued)

*Primary Examiner* — Jason Mandeville
(74) *Attorney, Agent, or Firm* — K&L Gates LLP

(57) ABSTRACT

An HMD system according to the present technology includes a coordinate system setting unit, a segment selection unit, and an image generation unit. The coordinate system setting unit sets, in a real space, a cylindrical coordinate system partitioned into a plurality of segments. The segment selection unit brings, based on a direction of the display, any of the plurality of segments into a selection stand-by state in the cylindrical coordinate system. When the selection of the segment held in the selection stand-by state is determined, the image generation unit generates a display image to be displayed on the display corresponding to the determined segment.

18 Claims, 14 Drawing Sheets

(51) Int. Cl.
*G06F 3/01* (2006.01)
*G02B 27/01* (2006.01)
*G06F 3/0484* (2013.01)

(52) U.S. Cl.
CPC .......... *G06F 3/012* (2013.01); *G06F 3/04842* (2013.01); *G02B 2027/0178* (2013.01); *G06F 3/0484* (2013.01)

(58) Field of Classification Search
CPC .. G02B 27/01; G02B 27/017; G02B 27/0178; G02B 27/0179; G02B 27/0187; G01C 21/365
USPC .......................................... 345/156–157, 7–9
See application file for complete search history.

(56) References Cited

U.S. PATENT DOCUMENTS

| | | | | |
|---|---|---|---|---|
| 6,320,559 | B1* | 11/2001 | Yasukawa | G02B 27/017 345/158 |
| 6,351,261 | B1* | 2/2002 | Reichlen | G06F 3/011 345/427 |
| 7,113,151 | B2* | 9/2006 | Kinebuchi | G02B 27/017 345/156 |
| 8,643,951 | B1* | 2/2014 | Wheeler | G06F 3/012 359/630 |
| 9,285,872 | B1* | 3/2016 | Raffle | G06F 3/012 |
| 2002/0151337 | A1* | 10/2002 | Yamashita | A63F 13/06 463/8 |
| 2012/0026108 | A1 | 2/2012 | Sugita et al. | |
| 2012/0212398 | A1* | 8/2012 | Border | G02B 27/017 345/8 |
| 2013/0246967 | A1* | 9/2013 | Wheeler | G06F 3/012 715/784 |
| 2014/0101608 | A1* | 4/2014 | Ryskamp | G06F 3/0482 715/810 |
| 2015/0049002 | A1* | 2/2015 | Ishikawa | G02B 27/0093 345/8 |
| 2015/0130837 | A1* | 5/2015 | Ishikawa | G02B 27/0093 345/633 |

FOREIGN PATENT DOCUMENTS

| | | |
|---|---|---|
| JP | 2008-033891 | 2/2008 |
| JP | 2010-231290 | 10/2010 |
| JP | 2012-033043 | 2/2012 |
| WO | 2010/107072 | 9/2010 |

OTHER PUBLICATIONS

Japanese Office Action dated Aug. 8, 2017, corresponding to Japanese Patent Application No. P2015-501305 and English translation of same.

N. Kishishita et al., "Investigation of the Peripheral Visual Field for Information Display with a Wide Field-of-view See-through HMD using a Virtual Environment," IEICE Technical Report, MVE2012-23, Jun. 2012. 7 pages.

Y. Ban, et al., "A Study of Visual Navigating for Wearable Augmented Reality System.; An Astronomical Observation Supporting System based on Wearable Augmented Reality Technology," TVRSJ, vol. 6, No. 2, pp. 89-98, 2001. 11 pages.

* cited by examiner

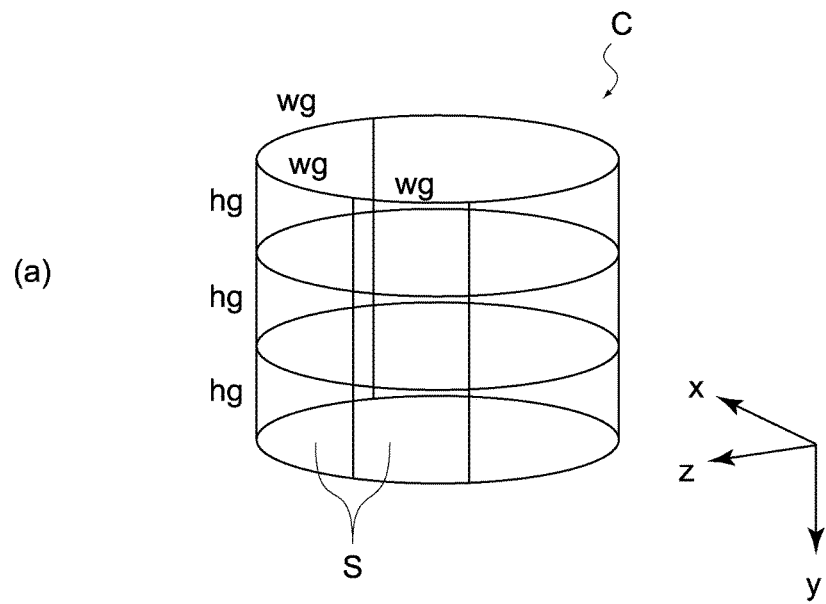
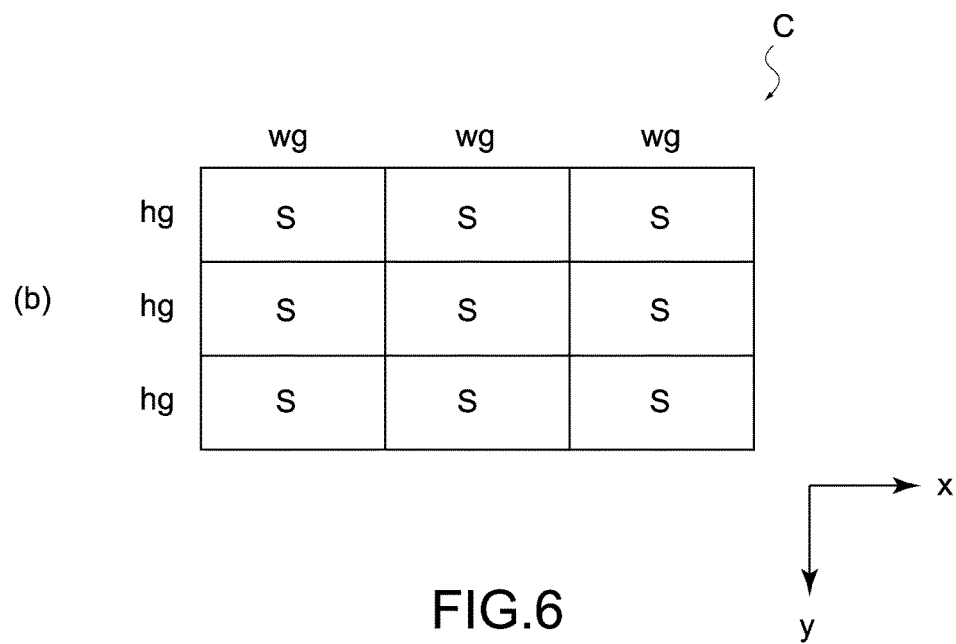
FIG.6

HEAD-MOUNTED DISPLAY SYSTEM, HEAD-MOUNTED DISPLAY, AND HEAD-MOUNTED DISPLAY CONTROL PROGRAM

CROSS REFERENCES TO RELATED APPLICATIONS

The present application is a national stage of International Application No. PCT/JP2014/000140 filed on Jan. 15, 2014 and claims priority to Japanese Patent Application No. 2013-033077 filed on Feb. 22, 2013, the disclosure of which is incorporated herein by reference.

BACKGROUND

The present technology relates to operations of a head-mounted display.

In recent years, a head-mounted display (hereinafter, referred to as HMD) that is supported on the head of a user and capable of displaying images in front of the eyes of the user has prevailed. Although the HMD has been generally used for watching movies and the like, a see-through-type HMD or the like with which both of the outside world and the display can be viewed has been developed. It is expected to be applied to a field of assisting the user to perform tasks.

For example, Patent Document 1 has disclosed a technique relating to operations of the HMD. In this technique, a motion of the head of the user is detected, a computer device is controlled based on the motion, and it is fed back to the display of the HMD. The motion of the head of the user is handled as an operation input with respect to the computer device.

Patent Document 1: Japanese Patent Application Laid-open No. 2010-231290

SUMMARY

Problem to be Solved by the Invention

However, in the technique as described in Patent Document 1, also if the user moves the head without intending to operate the HMD, there is a fear that the motion is considered as an operation input. It is not appropriate for controlling the HMD while viewing the outside world. An operation device such as a control box that the user holds in his or her hand for performing an operation input is generally used for controlling the HMD. However, in this case, it is impossible to perform a hands-free operation while viewing the outside world.

In view of the above-mentioned circumstances, it is an object of the present technology to provide a head-mounted display system, a head-mounted display, and a head-mounted display control program that are capable of achieving good operability without needing an operation device for operating an HMD.

Means for Solving the Problem

In order to achieve the above-mentioned object, a head-mounted display system according to an embodiment of the present technology includes a coordinate system setting unit, a segment selection unit, and an image generation unit.

The coordinate system setting unit sets a cylindrical coordinate system partitioned into a plurality of segments in a real space.

The segment selection unit brings, based on a direction of the display, any of the plurality of segments into a selection stand-by state in the cylindrical coordinate system.

The image generation unit generates, when the selection of the segment held in the selection stand-by state is determined, a display image to be displayed on the display corresponding to the determined segment.

With this configuration, when the user who wears the head-mounted display moves the head and the direction of the display is changed, the segment in the cylindrical coordinate system is brought into the selection stand-by state based on the direction of the display. When the selection of the segment in the selection stand-by state is determined, the display image corresponding to the segment is displayed on the display. That is, without using the operation device, the user can operate the head-mounted display using the direction of the display.

The segment selection unit may acquire, based on the direction of the display, an angle-of-view range occupied by an angle of view of the display in the cylindrical coordinate system, and bring a segment of the plurality of segments, which has a largest area in the angle-of-view range, into the selection stand-by state.

With this configuration, the segment located in the direction of the display in the cylindrical coordinate system is brought into the selection stand-by state. That is, the user can bring the segment into the selection stand-by state by directing the display to the particular segment in the cylindrical coordinate system.

The segment selection unit may acquire, based on the direction of the display, a coordinate located in the direction of the display in the cylindrical coordinate system and bring a segment of the plurality of segments, which includes the coordinate, into the selection stand-by state.

With this configuration, the segment located in the direction of the display in the cylindrical coordinate system is brought into the selection stand-by state. That is, the user can bring the segment into the selection stand-by state by directing the display to the particular segment in the cylindrical coordinate system.

The segment selection unit may receive a first trigger input and determine the selection of the segment held in the selection stand-by state.

This configuration enables the user to perform the first trigger input when the particular segment is held in the selection stand-by state, and to determine the selection of the segment. With this, the display image corresponding to the segment determined by the image generation unit is generated and can be viewed by the user.

The cylindrical coordinate system may set a vertical direction as a height direction and a horizontal direction as a circumferential direction.

With this configuration, when selecting the segment using the direction of the display, the user can perform the selection with the horizontal direction being a reference.

The coordinate system setting unit may receive a second trigger input and move the cylindrical coordinate system in a height direction of the cylindrical coordinate system.

With this configuration, the user can adjust the height of the cylindrical coordinate system to be used.

The coordinate system setting unit may divide the cylindrical coordinate system in a height direction and a circumferential direction of the cylindrical coordinate system, to thereby partition the cylindrical coordinate system into the plurality of segments.

With this configuration, the cylindrical coordinate system is partitioned into rectangular segments.

The coordinate system setting unit may divide the cylindrical coordinate system in directions that are oblique to a height direction and a circumferential direction of the cylindrical coordinate system, to thereby partition the cylindrical coordinate system into the plurality of segments.

With this configuration, the cylindrical coordinate system is partitioned into rhombic segments.

The head-mounted display system may further include an object arrangement unit that arranges an object in each of the plurality of segments, in which the image generation unit generates, corresponding to the angle-of-view range in the cylindrical coordinate system, an image of the object as the display image.

With this configuration, while referring to the image of the object, the user can bring the segment in which a desired object is located into the selection stand-by state and can use an application or the like corresponding to the object.

The segment selection unit may be configured not to bring a segment in which the object is not arranged into the selection stand-by state.

With this configuration, it is possible to prevent the selection of the segment in which no object is arranged from being determined.

The object arrangement unit may be configured not to arrange the object in a segment of the plurality of segments, which is present in a front direction of the display in the real space.

With this configuration, the image of the object is not displayed on the display when the display is directed in the front direction, and hence the user can view the outside world with the field of view not being obstructed.

The object may be an icon of an application, and the image generation unit may generate, when a selection of a segment in which a particular icon is arranged is determined, the display image based on an output of an application corresponding to the icon.

With this configuration, the user can select an arbitrary application using the direction of the display and display the output on the display.

The object may be a widget generated by a predetermined application, and the image generation unit may generate, when a selection of a segment in which a particular widget is arranged is determined, the display image based on an output of an application corresponding to the widget.

With this configuration, the user can check the widget using the direction of the display and cause the display to display an output of an application corresponding to the widget if necessary.

The object may be an application launcher, and the image generation unit may generate, when a selection of a segment in which an application launcher is arranged is determined, an image including an application selection menu as the display image.

With this configuration, the user can select the application launcher using the direction of the display and select an arbitrary application.

The object may be a notification generated by a predetermined application, and the image generation unit may generate, when a selection of a segment in which a particular notification is arranged is determined, the display image based on an output of the application that generates the notification.

With this configuration, the user can check the notification using the direction of the display and cause the display to display the output of the application that has generated the notification if necessary.

The display may be a see-through-type display.

With this configuration, the user can view the outside world through the see-through-type display. Therefore, the user can perform a task while viewing the outside world through the see-through-type display, change the direction of the display if necessary, and refer to a display image displayed on the see-through-type display.

In order to achieve the above-mentioned object, a head-mounted display according to an embodiment of the present technology includes a coordinate system setting unit, a segment selection unit, and an image generation unit.

The coordinate system setting unit sets a cylindrical coordinate system partitioned into a plurality of segments in a real space.

The segment selection unit brings, based on a direction of the display, any of the plurality of segments into a selection stand-by state in the cylindrical coordinate system.

The image generation unit generates, when the selection of the segment held in the selection stand-by state is determined, a display image to be displayed on the display corresponding to the determined segment.

In order to achieve the above-mentioned object, a head-mounted display control program according to an embodiment of the present technology causes a computer to function as a coordinate system setting unit, a segment selection unit, and an image generation unit.

The coordinate system setting unit sets a cylindrical coordinate system partitioned into a plurality of segments in a real space.

The segment selection unit brings, based on a direction of the display, any of the plurality of segments into a selection stand-by state in the cylindrical coordinate system.

The image generation unit generates, when the selection of the segment held in the selection stand-by state is determined, a display image to be displayed on the display corresponding to the determined segment.

Effect of the Invention

As described above, according to the present technology, it is possible to provide a head-mounted display system, a head-mounted display, and a head-mounted display control program capable of achieving good operability without needing an operation device for operating an HMD.

Additional features and advantages are described herein, and will be apparent from the following Detailed Description and the figures.

BRIEF DESCRIPTION OF THE FIGURES

FIG. 6 A schematic diagram showing segments of the cylindrical coordinate system according to the head head-mounted display system.

DETAILED DESCRIPTION

Configuration of Head-Mounted Display System

Figure 1:
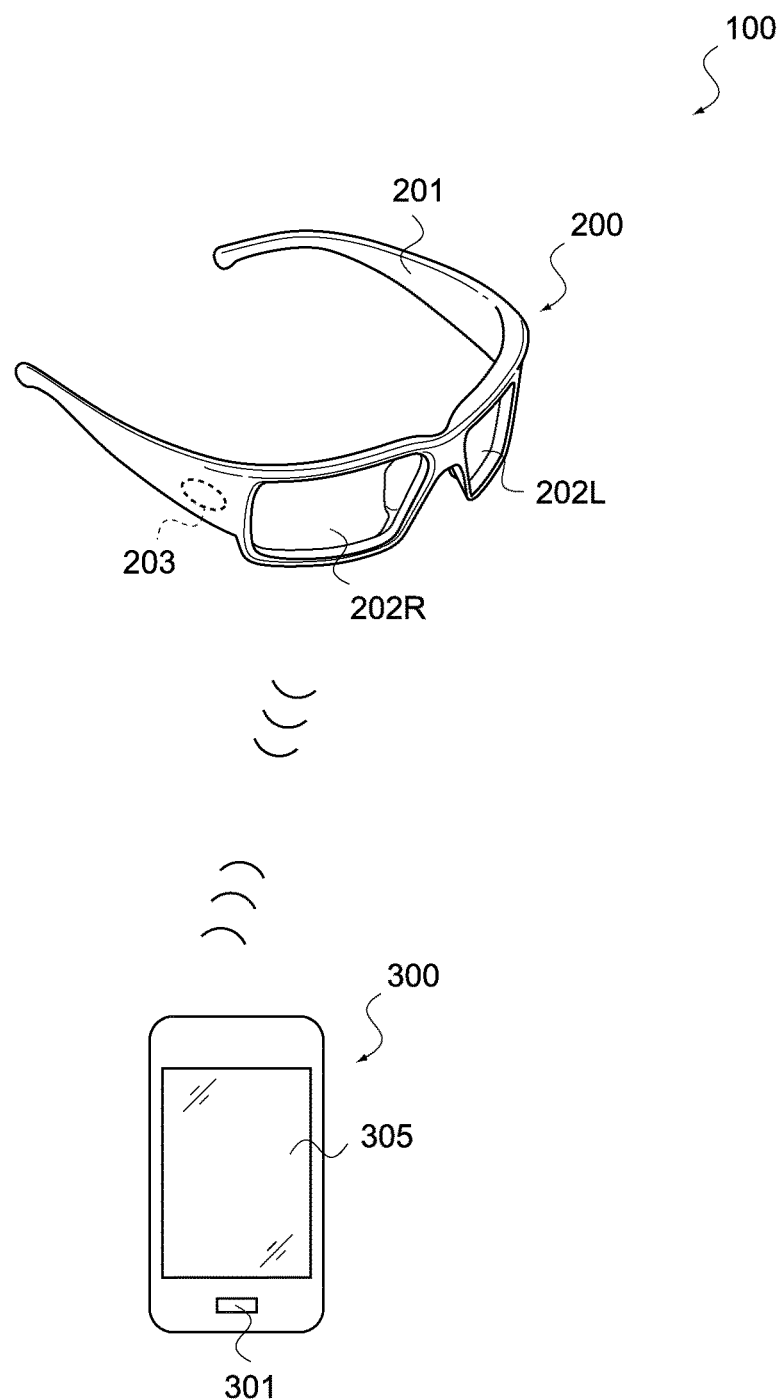
FIG. 1 A perspective view showing an outer appearance of a head-mounted display system according to an embodiment of the present technology.
Figure 2:
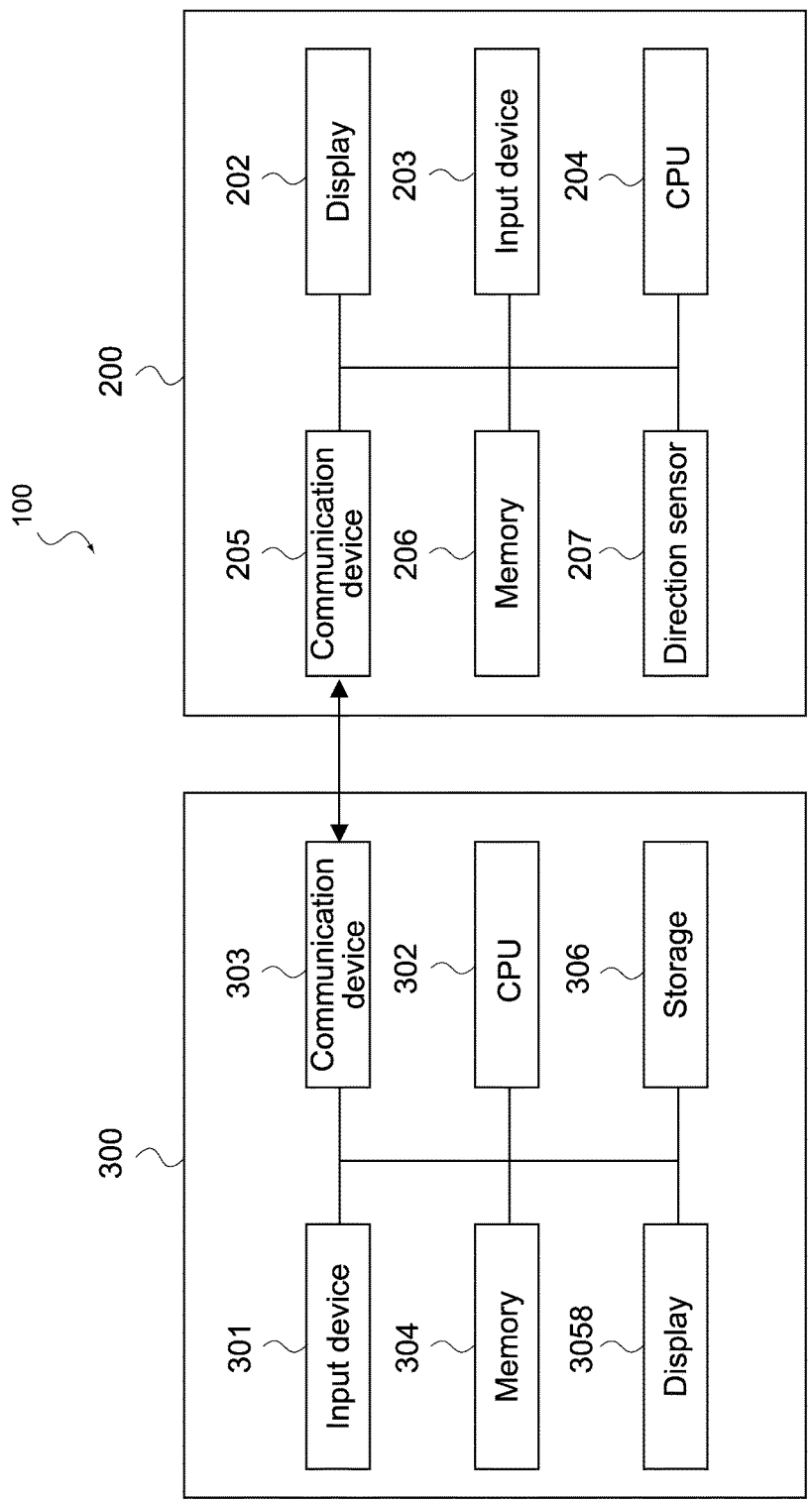
FIG. 2 A block diagram showing a configuration of the head-mounted display system.

FIG. 1 is a perspective view showing an outer appearance of a head-mounted display system 100 (hereinafter, referred to as HMD system 100) according to this embodiment. FIG. 2 is a block diagram showing a configuration of the HMD system 100. As shown in the figures, the HMD system 100 can be constituted of a head-mounted display 200 (hereinafter, referred to as HMD 200) and an information processing apparatus 300.

As shown in FIGS. 1 and 2, the HMD 200 includes a frame 201, displays 202 (right display 202R and left display 202L), an input device 203, a CPU 204, a communication device 205, a memory 206, and a direction sensor 207.

The frame 201 supports the HMD 200 on the head of the user and places the displays 202 in front of the eyes of the user. The shape of the frame 201 is not particularly limited and may be a headgear shape or the like other than the eyeglass shape shown in FIG. 1.

The displays 202 (right display 202R and left display 202L) display display images. The right display 202R is placed in the front of the right eye of the user and the left display 202L is placed in the front of the left eye of the user. Note that either one of the right display 202R and the left display 202L may be provided. The display 202 can be a see-through-type display or a non-see-through-type display. In this embodiment, the see-through-type display is favorable.

The input device 203 receives an operation input made by the user. For the input device 203, those that are capable of detecting proximity or contact of an operating element (finger of user or the like), for example, an operation button, a touch sensor, a proximity sensor, or an illuminance sensor can be used. The position of the input device 203 and the number of input devices 203 are not particularly limited.

The central processing unit (CPU) 204 executes various types of arithmetic processing. The CPU 204 processes input of the input device 203 and communication of the communication device 205, generates display images of the display 202, and so on. The communication device 205 communicates with a communication device 303 (to be described later) of the information processing apparatus 300 in accordance with various communication standards such as universal serial bus (USB), Bluetooth (registered trademark), and Wi-Fi (registered trademark). The memory 206 stores various types of information on results and the like of arithmetic processing of the CPU 204, display images, and the like.

The direction sensor 207 detects a direction of the display 202. The direction sensor 207 can be constituted of a magnetic-field sensor, an angular velocity sensor, an acceleration sensor, and the like. Otherwise, a sensor capable of detecting the direction of the display 202 can be used.

As shown in FIGS. 1 and 2, the information processing apparatus 300 includes an input device 301, a CPU 302, the communication device 303, a memory 304, a display 305, and storage 306. The information processing apparatus 300 can be various information processing apparatuses such as a smart phone, a tablet computer, and a laptop computer. Those that can be carried together with the HMD 200 are favorable as the information processing apparatus 300.

The input device 301 receives an operation input made by the user. The input device 301 can be a touch panel, an operation button, or the like. The CPU 302 processes input by the input device 301 and communication by the communication device 303, executes applications, and so on. The communication device 303 communicates with the communication device 205 of the HMD 200 in accordance with various communication standards. The memory 307 stores results and the like of arithmetic processing of the CPU 302. The storage 306 stores applications and image information.

The configurations of the HMD 200 and the information processing apparatus 300 are not limited to those described herein and only need to be capable of realizing functional configurations to be described later.

[Functional Configurations of Head-Mounted Display System]

Figure 3:
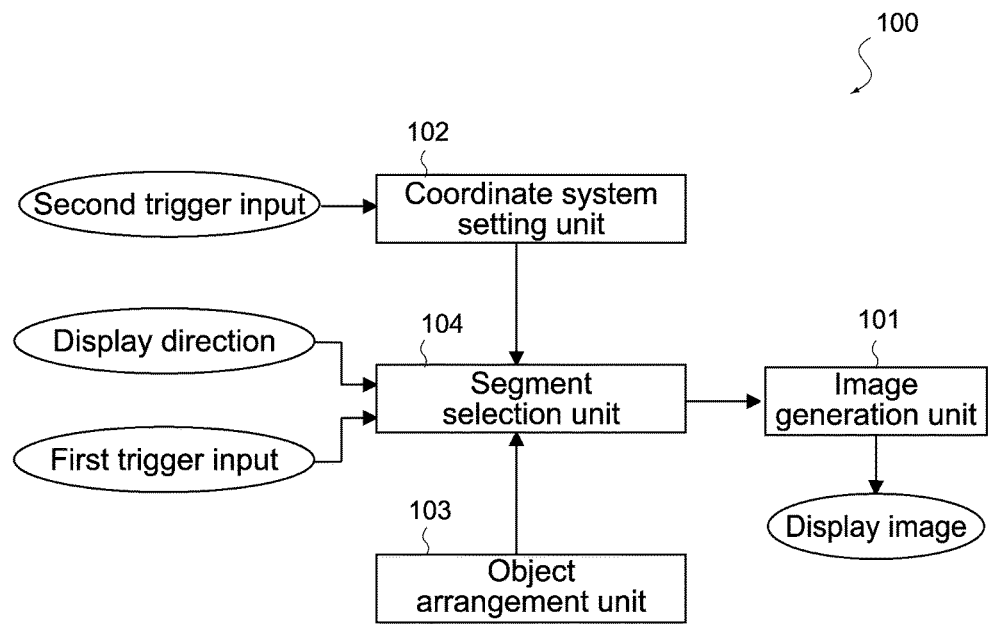
FIG. 3 A schematic diagram showing functional configurations of the head head-mounted display system.

Functional configurations of the HMD system 100 realized by a hardware configuration as described above will be described. FIG. 3 is a schematic diagram showing the functional configurations of the HMD system 100.

As shown in the figure, the HMD system 100 includes an image generation unit 101, a coordinate system setting unit 102, an object arrangement unit 103, and a segment selection unit 104. Note that the functional configurations may be realized by either one of the HMD 200 and the information processing apparatus 300 or may be realized by the cooperation of the both. Further, some or all of functional configurations may be realized in a computer network.

Figure 4:
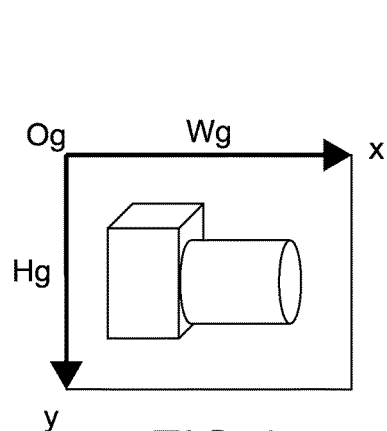
FIG. 4 A schematic diagram showing a display coordinate system in the head head-mounted display system.

The image generation unit 101 generates display images to be displayed on the displays 202. At this time, the image generation unit 101 generates a display image using a coordinate system in the display 202 (hereinafter, referred to as display coordinate system). FIG. 4 is a schematic diagram showing a display coordinate system D. As shown in the figure, in the display coordinate system D, the upper left of the display is set as an origin Og, a right-hand direction on the display is set as an x-axis, and a lower direction on the display is set as a y-axis. A width Wg in an x-axis direction by a height Hg in a y-axis direction equals the size of the display image. Generation of the display image by the image generation unit 101 will be described later.

The coordinate system setting unit 102 sets the cylindrical coordinate system in a real space. Specifically, the coordinate system setting unit 102 sets, for example, the direction of the display 202 when the HMD 200 is powered on or when a predetermined operation input is performed on the HMD 200, as a front direction. The coordinate system setting unit 102 is capable of acquiring the direction of the display 202 from the direction sensor 207.

The coordinate system setting unit 102 is capable of setting a direction perpendicular to the front direction of the display 202 as the axis direction and a cylindrical coordinate system having a center axis passing through a position of the HMD 200 (origin of user) as the cylindrical coordinate system. With this, the cylindrical coordinate system with the axis direction of the center axis being a height direction and the direction perpendicular to the axis direction being a circumferential direction is formed. Alternatively, the coordinate system setting unit 102 may set the center axis of the cylindrical coordinate system as a vertical direction irrespective of the front direction of the display 202. In this case, a cylindrical coordinate system with the vertical direction being the height direction and a horizontal direction being the circumferential direction is formed.

Figure 5:
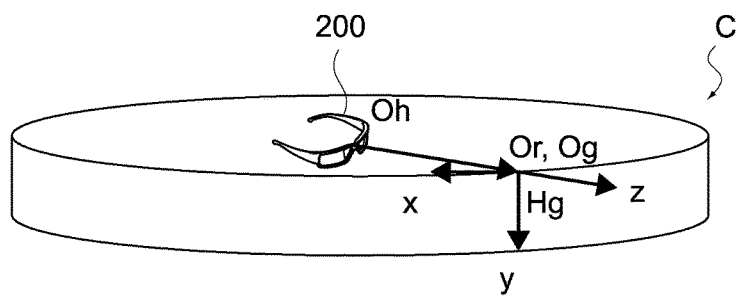
FIG. 5 A schematic diagram showing a cylindrical coordinate system according to the head head-mounted display system.

FIG. 5 is a schematic diagram showing a cylindrical coordinate system C. As shown in the figure, the cylindrical coordinate system has an x-axis in the circumferential direction having a radius from a user origin Oh to a display coordinate system origin Or, a z-axis in a radial direction, and a y-axis in a direction perpendicular to the x-axis and the z-axis. Assuming that the height (y-direction) of the cylindrical coordinate system is Hg, a cylinder having the height Hg is formed around the user (HMD 200).

The coordinate system setting unit 102 sets a cylindrical coordinate system partitioned into a plurality of segments. FIG. 6 is a schematic diagram showing the segments in the cylindrical coordinate system. (a) of FIG. 6 indicates a perspective view of the cylindrical coordinate system C and (b) of FIG. 6 shows a development view of the cylindrical coordinate system C. As shown in (a) and (b) of FIG. 6, the coordinate system setting unit 102 sets the cylindrical coordinate system C partitioned into a plurality of segments S. Here, the coordinate system setting unit 102 is capable of dividing the cylindrical coordinate system C in the height direction (y-direction) and the circumferential direction (xz-direction) and partitioning it into the rectangular segments S. The height (y-direction) of each of the segments S is set as hg and a width (xz-direction) is set as wg.

Figure 7:
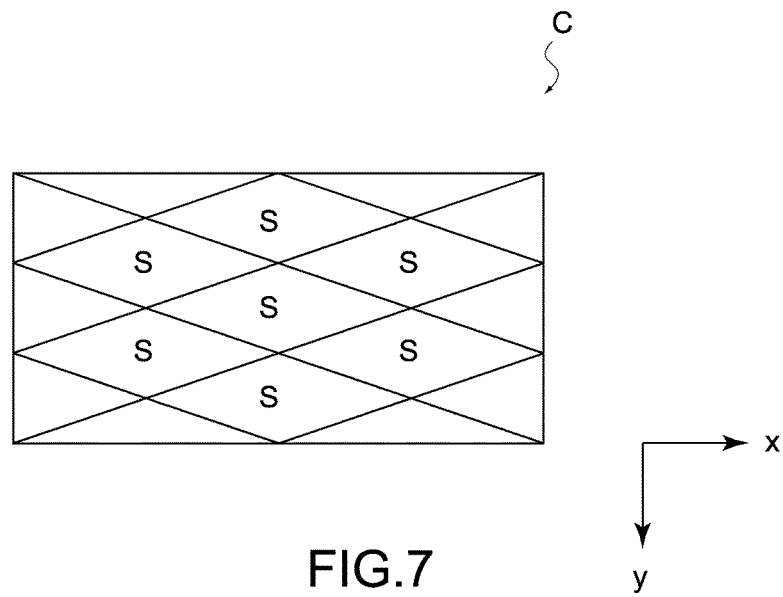
FIG. 7 A schematic diagram showing segments of the cylindrical coordinate system according to the head head-mounted display system.

Note that, although, in FIG. 6, the cylindrical coordinate system is divided into three in the height direction and the circumferential direction and partitioned into the rectangular segments, it is not limited to be partitioned into three. Further, the shape of each of the segments is not limited to the rectangle. As shown in FIG. 7, the coordinate system setting unit 102 is also capable of dividing the cylindrical coordinate system C in directions that are oblique to the height direction (y-direction) and the circumferential direction (xz-direction) and partitioning it into rhombic segments. Hereinafter, the description will be made using the rectangular segments as an example.

The coordinate system setting unit 102 is capable of setting a segment of the plurality of segments, which is located at a center in the height direction and the circumferential direction of the cylindrical coordinate system, to be in the front direction of the display 202. Hereinafter, the segment located at the center will be referred to as a center segment. Note that the coordinate system setting unit 102 may set the cylindrical coordinate system such that a segment other than the center segment is in the front direction of the display 202.

Figure 8:
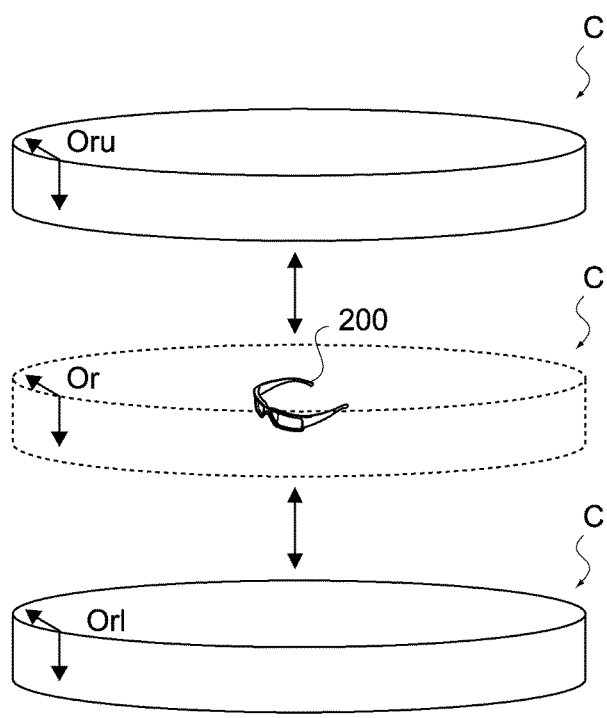
FIG. 8 A schematic diagram showing a movement of the cylindrical coordinate system according to the head head-mounted display system in a height direction.

When receiving a predetermined trigger input (second trigger input), the coordinate system setting unit 102 can be configured to move the cylindrical coordinate system in the height direction thereof. FIG. 8 is a schematic diagram showing the cylindrical coordinate system C that is moved by the coordinate system setting unit 102 in the height direction of the cylindrical coordinate system. An origin Oru is an origin when the cylindrical coordinate system is moved upwardly in the height direction and an origin Orl is an origin when the cylindrical coordinate system is moved downwardly in the height direction. The moving direction and moving amount of the cylindrical coordinate system can be determined according to an operation input made by the user.

Figure 9:
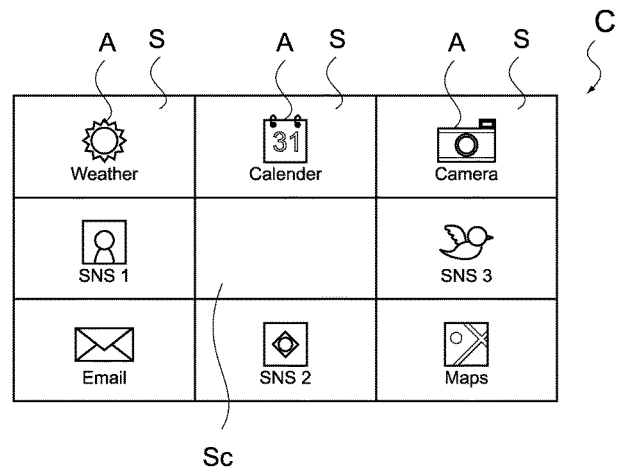
FIG. 9 A schematic diagram showing an object arranged in each of the segments of the cylindrical coordinate system according to the head head-mounted display system.

The object arrangement unit 103 arranges an object in each of the segments. FIG. 9 is a schematic diagram showing an object A arranged in each of the segments S. As shown in the figure, the object arrangement unit 103 can be configured to arrange the objects A in the segments S. Although the objects A can be icons or widgets of applications, application launchers, or notifications, the details will be described later. As shown in FIG. 9, the object arrangement unit 103 can be configured not to arrange the object A in a center segment Sc.

Figure 10:
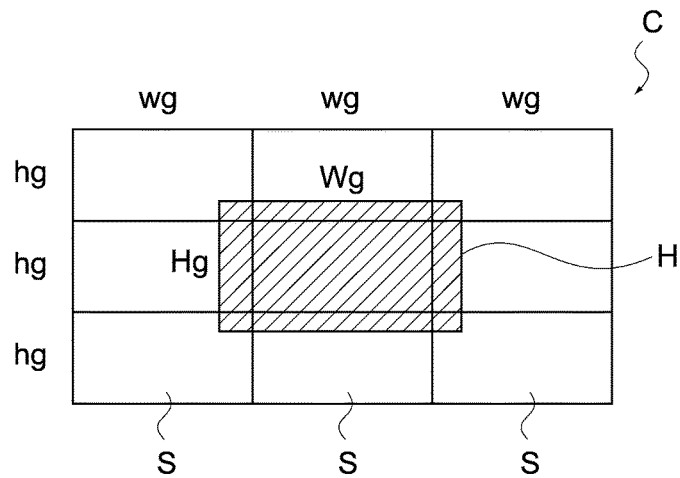
FIG. 10 A schematic diagram showing an angle-of-view range in the cylindrical coordinate system in the head head-mounted display system.

The segment selection unit 104 brings, based on the direction of the display 202, any of the plurality of segments into a selection stand-by state. Specifically, the segment selection unit 104 can use an "angle-of-view range" for selecting the segment. FIG. 10 is an example of the angle-of-view range and shows an angle-of-view range H in the cylindrical coordinate system C. The segment selection unit 104 acquires, based on the direction of the display 202 and the radius of the cylindrical coordinate system, a range occupied by the angle of view of the display 202 in the cylindrical coordinate system C, as the angle-of-view range. When the direction of the display 202 in the real space is changed, the angle-of-view range H in the cylindrical coordinate system C is moved due to the change.

Figure 11:
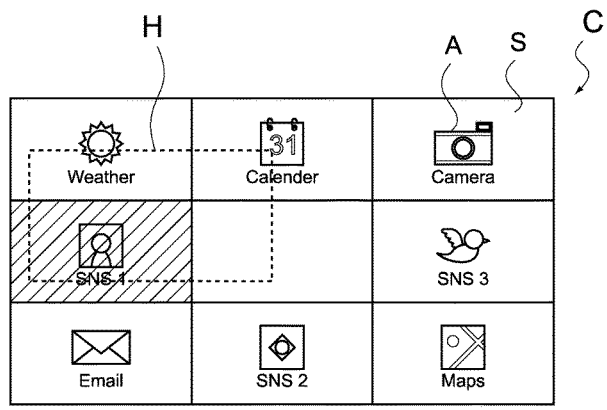
FIG. 11 A schematic diagram showing a selection of the segment by a segment selection unit of the head head-mounted display system.

The segment selection unit 104 can use the angle-of-view range for selecting one segment from the plurality of segments. FIG. 11 is a schematic diagram showing a selection of the segment by the segment selection unit 104. As shown in the figure, the segment selection unit 104 brings the segment S (oblique lines in the figure) of the plurality of segments S, which has a largest area in the angle-of-view range H, into the selection stand-by state.

When receiving a predetermined trigger input (referred to as first trigger input) while the particular segment is held in the selection stand-by state, the segment selection unit 104 determines the selection of the segment in the selection stand-by state. The first trigger input can be a touch input made by the user or time out (elapse of set time). When determining the selection of the segment, the segment selection unit 104 informs the image generation unit 101 of the determined segment.

Otherwise, when the orientation of the display 202 is changed and the segment having a largest area in the angle-of-view range is changed to another segment while the particular segment is held in the selection stand-by state, the segment selection unit 104 releases the selection stand-by state of the segment.

Figure 12:
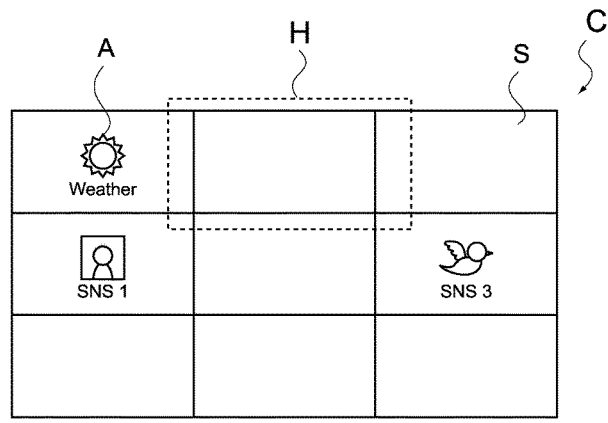
FIG. 12 A schematic diagram showing segments of the cylindrical coordinate system according to the head head-mounted display system, in which no object is arranged.

The segment selection unit 104 can be configured not to bring the segment in which no object is arranged into the selection stand-by state. FIG. 12 is a schematic diagram showing a segment S in which no object A is arranged. As shown in the figure, in the case where the segment S having a largest area in the angle-of-view range H is the segment S in which no object A is arranged, the segment selection unit 104 can be configured not to bring this segment S into the selection stand-by state. Note that the segment S in which no object A is arranged may be the above-mentioned center segment or may be another segment.

The image generation unit 101 generates a display image in accordance with the display coordinate system and supplies it to the display 202. When the segment selection unit 104 determines the selection of a particular segment, the image generation unit 101 generates a display image including a display corresponding to the segment. The display corresponding to the segment can be, for example, a display based on an output of an application corresponding to the object arranged in that segment.

Further, the image generation unit 101 can be configured to generate, based on the angle-of-view range in the cylindrical coordinate system, an image of an object as the display image. In the case where the angle-of-view range includes the object, the image generation unit 101 can be configured to arrange an image of the object in the display coordinate system, corresponding to the position of the object in the angle-of-view range, and generate it as the display image. The details will be described later.

[Operation of Head-Mounted Display System]

An operation of the HMD system 100 will be described. When the user wears the HMD 200 and performs a predetermined operation input by operating the input device 203 or the information processing apparatus 300, the coordinate system setting unit 102 recognizes a direction of the display 202 at this time as the front direction of the display 202.

The coordinate system setting unit 102 sets the above-mentioned cylindrical coordinate system in the real space. At this time, the coordinate system setting unit 102 can set the cylindrical coordinate system such that the center segment is located in the front direction of the display 202. Note that the coordinate system setting unit 102 may place a segment other than the center segment in the front direction of the display 202. As shown in FIG. 9, the object arrangement unit 103 arranges the object A in each of the segments S.

Figure 13:
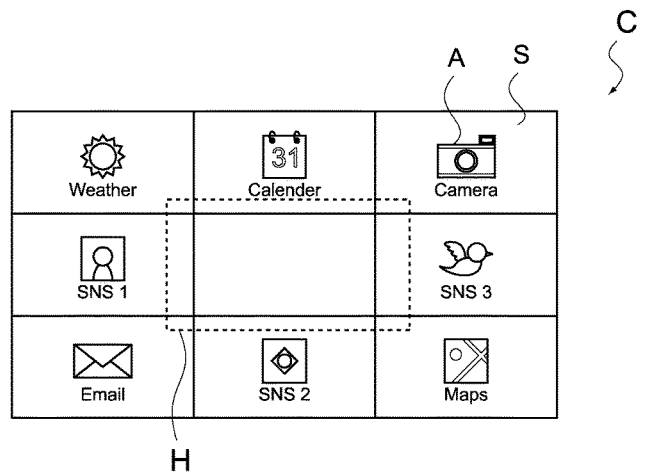
FIG. 13 A schematic diagram showing an angle-of-view range in the cylindrical coordinate system in the head head-mounted display system.

The segment selection unit 104 acquires an angle-of-view range of the display 202 in the cylindrical coordinate system. While the user does not move the head (direction of display 202) from the front direction, the angle-of-view range includes the center segment as shown in FIG. 13 and no object is arranged in the center segment, and hence the image generation unit 101 does not generate the display image. In this state, the user can perform a task or the like while viewing the outside world through the display 202 on which nothing is displayed.

Figure 14:
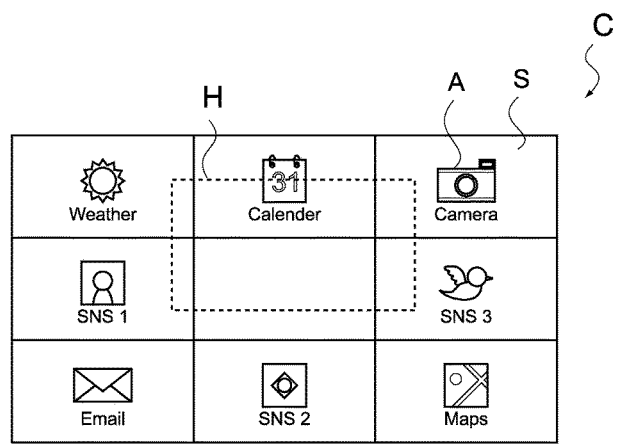
FIG. 14 A schematic diagram showing an angle-of-view range in the cylindrical coordinate system in the head head-mounted display system.
Figure 15:
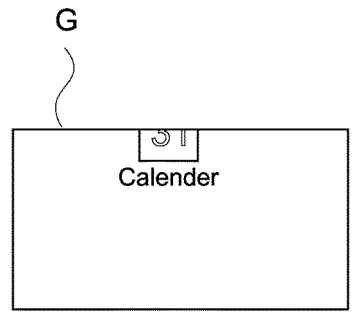
FIG. 15 A schematic diagram showing a display image generated by an image generation unit of the head head-mounted display system.

When the user moves the orientation of the head (direction of display 202), the segment selection unit 104 moves the angle-of-view range based on the direction of the display 202. FIG. 14 is a schematic diagram showing the angle-of-view range H moved. As shown in the figure, when the angle-of-view range H includes the object A, the image generation unit 101 generates an image of the object (hereinafter, referred to as object image) as the display image. FIG. 15 is a schematic diagram showing a display image G at this time.

The image generation unit 101 can be configured to arrange the object image in the display coordinate system, corresponding to the position of the object in the angle-of-view range. That is, when directing the head from the front direction to any direction, the user can view the object image arranged in the segment in that direction and is enabled to search for an icon of a desired application, for example.

At the same time, as shown in FIG. 11, the segment selection unit 104 detects an area of each of the segments S in the angle-of-view range H and brings the segment S having a largest area in the angle-of-view range H into the selection stand-by state. At this time, the image generation unit 101 may present the fact that the segment in which that object is arranged is held in the selection stand-by state to the user by, for example, flashing or enlarging the object image of the object arranged in the segment held in the selection stand-by state.

Figure 16:
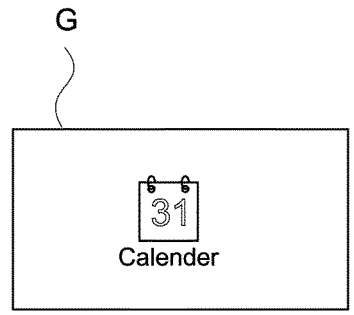
FIG. 16 A schematic diagram showing a display image generated by the image generation unit of the head head-mounted display system.
Figure 17:
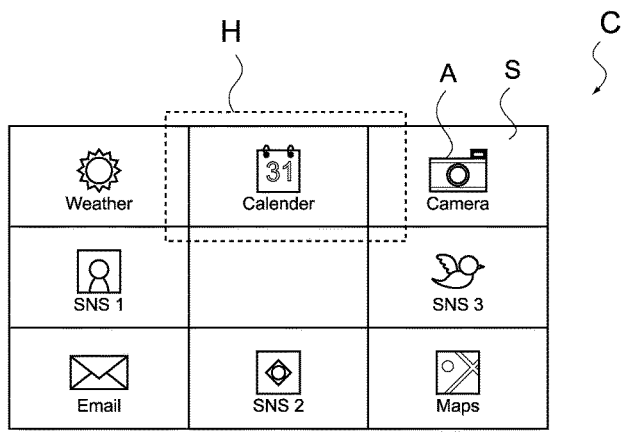
FIG. 17 A schematic diagram showing an angle-of-view range in the cylindrical coordinate system in the head head-mounted display system.

When the user is viewing the object image of the desired object near the center of the display 202 as shown in FIG. 16, the segment arranged in that object is the segment having a largest area in the angle-of-view range. FIG. 17 is a schematic diagram showing the angle-of-view range H at this time. The segment selection unit 104 brings that segment into the selection stand-by state.

Figure 18:
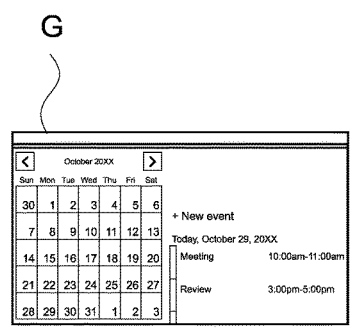
FIG. 18 A schematic diagram showing a display image generated by the image generation unit of the head head-mounted display system.

When the user performs the first trigger input in this state, the selection of the segment held in the selection stand-by state is determined. The image generation unit 101 generates a display image including a display corresponding to the segment instead of the object image. For example, in the case where the object is an icon of an application, as shown in FIG. 18, the image generation unit 101 generates an image generated by this application as the display image. That is, the user is enabled to view the image generated by the desired application.

Note that, as shown in FIG. 12, no object A is arranged in the segment S having a largest area in the angle-of-view range H, the segment selection unit 104 can be configured not to bring that segment S into the selection stand-by state. With this, the selection of the segment in which no object is arranged is prevented from being determined and the convenience is enhanced.

When receiving a predetermined input from the user, the image generation unit 101 can be configured to terminate the display image including the display corresponding to the segment and generate a display image (image of icon or the like) based on the angle-of-view range of the display 202 shown in FIGS. 15 and 16.

As described above, when the user faces the front direction, the user can perform a task or the like while viewing the outside world through the display 202 on which nothing is displayed. If necessary, by the user moving the direction of the head (display 202) to search for a desired object and performing the first trigger input, the user can view the display corresponding to the object. That is, without using an operation device such as a control box, the user can select an arbitrary object and the HMD system 100 provides good operability.

[Regarding Movement of Cylindrical Coordinate System]

Figure 19:
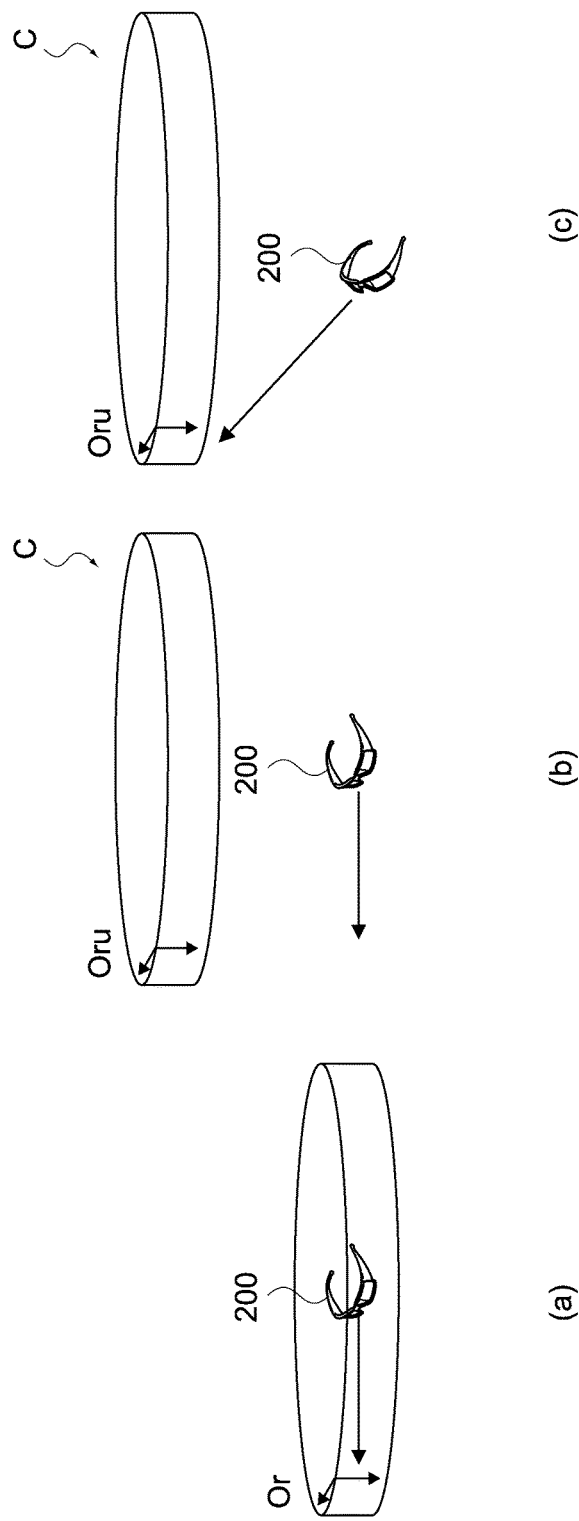
FIG. 19 A schematic diagram showing a movement of the cylindrical coordinate system by a coordinate system setting unit of the head head-mounted display system.

Although, as described above, the coordinate system setting unit 102 sets the cylindrical coordinate system, the cylindrical coordinate system can be moved in the height direction thereof (upwards or downwards). FIG. 19 is a schematic diagram showing a movement of the cylindrical coordinate system C by the coordinate system setting unit 102. As shown in (a) of FIG. 19, when the user specifies the front direction of the display 202, the cylindrical coordinate system C is set at the same height as the display 202 and the user can use it as described above.

When receiving the second trigger input made by the user, the coordinate system setting unit 102 moves the cylindrical coordinate system in the height direction thereof (upwardly in figure) as shown in (b) of FIG. 19. The second trigger input can be, for example, an input performed by the user touching the input device 203 and moving the direction of the display 202. The coordinate system setting unit 102 can be configured to move the cylindrical coordinate system C based on the direction of the display 202 (angle with respect to front direction).

With this, as shown in (b) of FIG. 19, the cylindrical coordinate system C is not present anymore at the same height as the display 202, and hence even if the user slightly changes the direction of the display 202 from the front direction, the segment is not brought into the selection stand-by state and the object image is not displayed.

Thus, the user can perform a task or the like while viewing the outside world in a wide range. On the other hand, the cylindrical coordinate system is set above or below the display 202, and hence, as shown in (c) of FIG. 19, the user is enabled to direct the display 202 to the upper or lower cylindrical coordinate system C and use the cylindrical coordinate system C.

By performing the second trigger input again in the state in which the cylindrical coordinate system C has been moved in the height direction, the user can move, as shown in (a) of FIG. 19 (a), the cylindrical coordinate system C to the same height as the display 202 and use it.

In this manner, by the coordinate system setting unit 102 moving the cylindrical coordinate system in the height direction, the user can perform a task or the like in a wide field of view and can use the cylindrical coordinate system depending on needs.

Modified Examples

Instead of the above-mentioned "angle-of-view range," the segment selection unit 104 can use a coordinate located in the direction of the display 202 in the cylindrical coordinate system (hereinafter, referred to as display direction coordinate) for selecting the segment. The segment selection unit 104 acquires, based on the direction of the display 202, a display direction coordinate P in the cylindrical coordinate system C. When the direction of the display 202 is changed in the real space, the display direction coordinate P in the cylindrical coordinate system C is moved along with the change.

Figure 20:
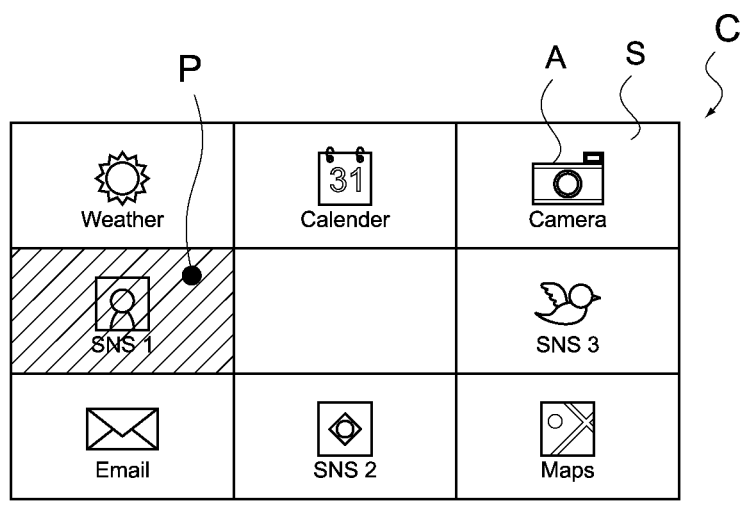
FIG. 20 A schematic diagram showing a selection of the segment by the segment selection unit of the head head-mounted display system.

The segment selection unit 104 can use this display direction coordinate for selecting one segment from the plurality of segments. FIG. 20 is a schematic diagram showing a selection of the segment by the segment selection unit 104. As shown in the figure, the segment selection unit 104 brings a segment S (oblique lines in the figure) of the plurality of segments S, which includes the display direction coordinate P, into the selection stand-by state.

When receiving a predetermined trigger input (referred to as first trigger input) while the particular segment is held in the selection stand-by state, the segment selection unit 104 determines the selection of the segment held in the selection stand-by state. The first trigger input can be a touch input made by the user or time out (elapse of set time). When determining the selection of the segment, the segment selection unit 104 informs the image generation unit 101 of the determined segment.

Otherwise, when the orientation of the display 202 is changed and the segment including the display direction coordinate is changed to another segment while the particular segment is held in the selection stand-by state, the segment selection unit 104 releases the selection stand-by state of the segment.

Also in the case where the segment selection unit 104 uses the display direction coordinate for selecting the segment in this manner, the user can select an arbitrary object without using the operation device such as a control box as in the case of using the angle-of-view range.

Further, the segment selection unit 104 can be configured not to bring the segment S into the selection stand-by state if the segment including the display direction coordinate is the segment in which no object is arranged. With this, the selection of the segment in which no object is arranged is prevented from being determined and the convenience is enhanced.

[Usage Examples of Head-Mounted Display System]

Specific usage examples of the HMD system 100 will be described.

(Application)

Figure 21:
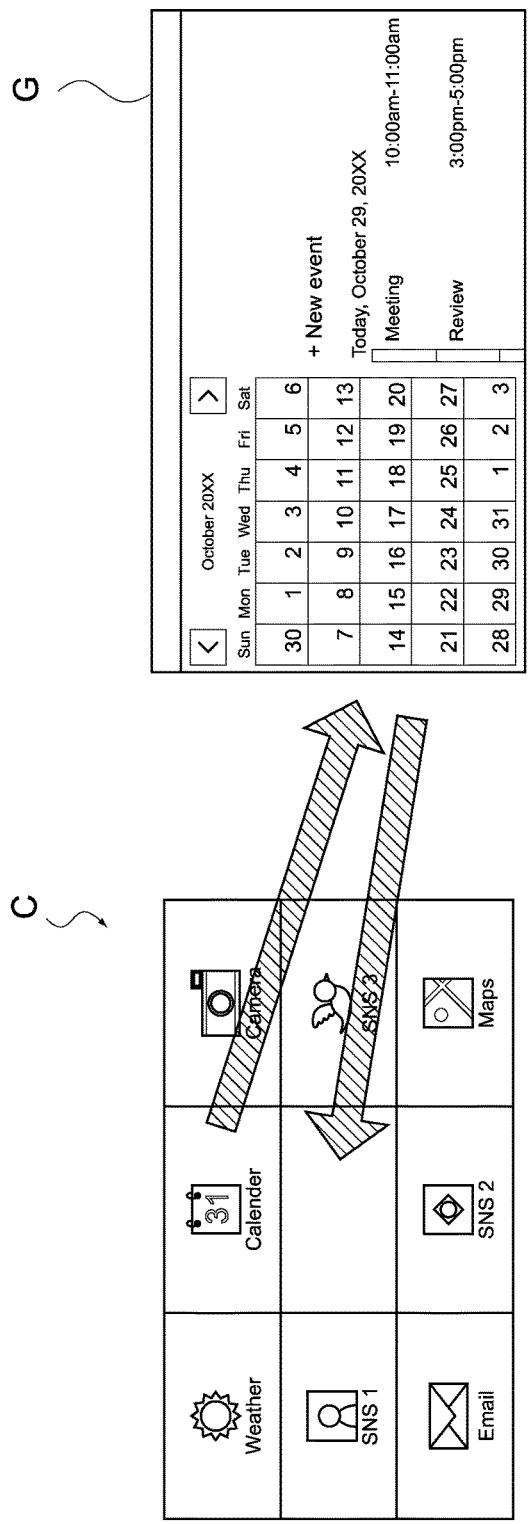
FIG. 21 A schematic diagram showing a usage example of an application by the head head-mounted display system.

As shown in FIG. 21, the object arrangement unit 103 is capable of arranging an icon of an application in each of the segments as the object. The user changes the orientation of the display 202 to select an arbitrary icon and performs the first trigger input. With this, the segment selection unit 104 determines the selection of the segment in which that icon is arranged and informs the image generation unit 101 of it.

The image generation unit 101 generates, based on an output of an application corresponding to that icon, a display image and supplies it to the display 202. With this, the user is enabled to view an image based on an output of the application. When receiving another trigger input made by the user, for example, an input indicating that the display 202 is directed in the lower direction, the image generation unit 101 removes an image based on the output of the application and generates the previous icon selection image. Thus, the user is enabled to easily use the application by the use of the HMD system 100.

(Widget)

Figure 22:
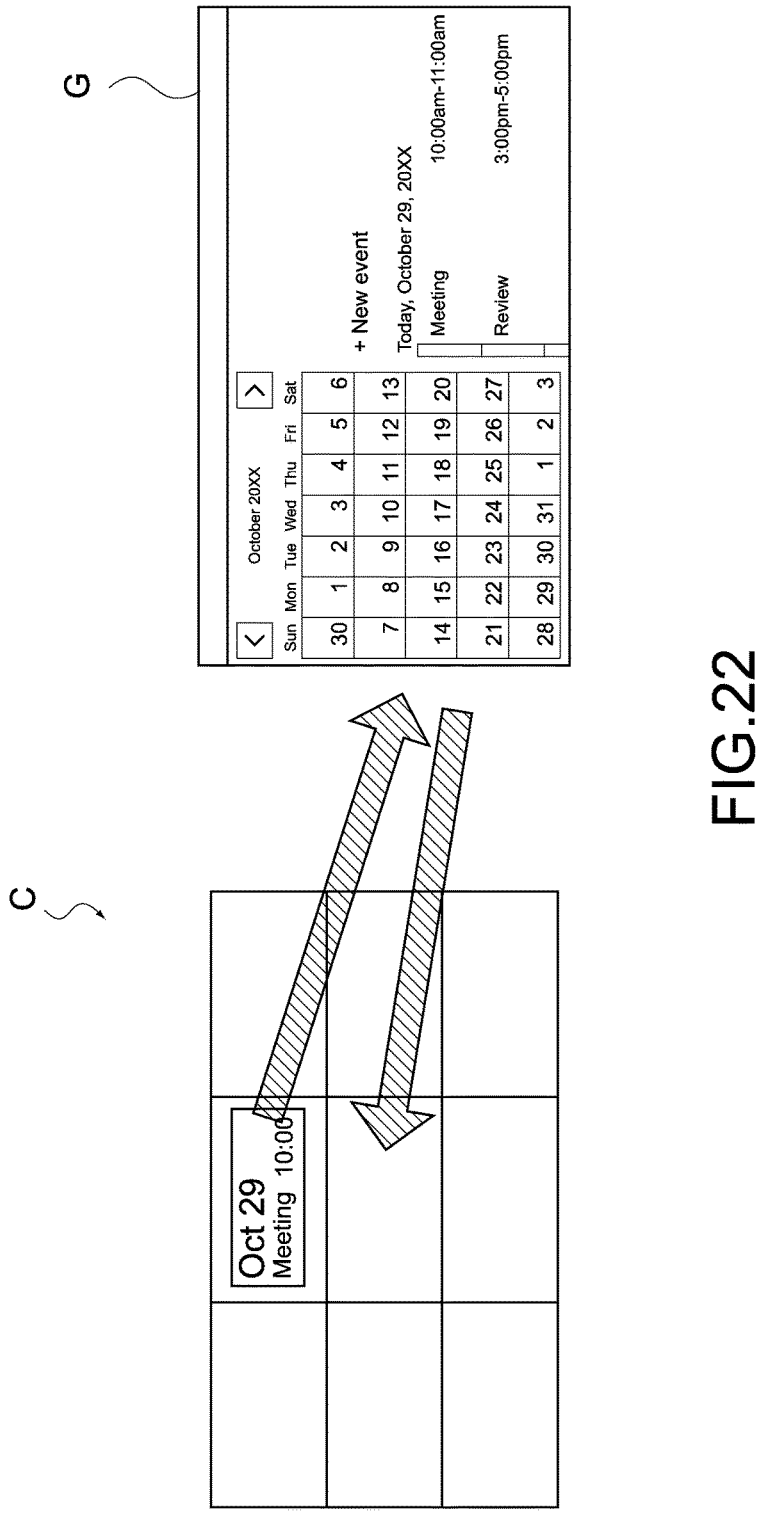
FIG. 22 A schematic diagram showing a usage example of a widget by the head head-mounted display system.

As shown in FIG. 22, the object arrangement unit 103 is capable of arranging a widget generated by a particular application in one or more segments as the object. The user can view the widget by changing the orientation of the display 202 and can easily acquire information. In addition, in the case where the user wishes to check the details of the widget, the user performs the first trigger input in the state in which the user is viewing the widget. With this, the segment selection unit 104 determines the selection of the segment in which that widget is arranged and informs the image generation unit 101 of it.

The image generation unit 101 generates a display image based on the output of the application that has generated that widget, and supplies it to the display 202. With this, the user is enabled to view an image based on the output of the application. When receiving another trigger input made by the user, the image generation unit 101 hides the image based on the output of the application and generates the previous icon selection image. In this manner, the user is enabled to easily acquire simple information from the widget by the use of the HMD system 100 and acquire detailed information depending on needs.

(Application Launcher)

Figure 23:
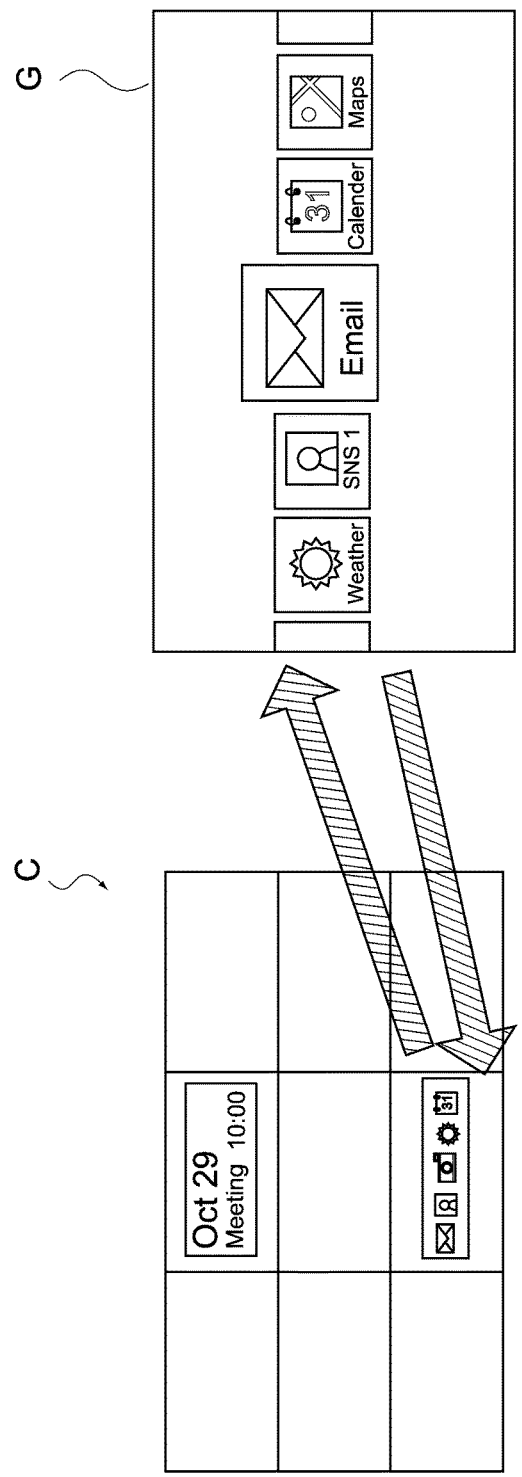
FIG. 23 A schematic diagram showing a usage example of an application launcher by the head head-mounted display system.

As shown in FIG. 23, the object arrangement unit 103 is capable of arranging an application launcher (hereinafter, referred to as launcher) as the object in one or more segments. The user can view the launcher by changing the orientation of the display 202. The user performs the first trigger input while viewing the launcher. With this, the segment selection unit 104 determines the selection of the segment in which that launcher is arranged and informs the image generation unit 101 of it.

The image generation unit 101 generates an image including an application selection menu as the display image and supplies it to the display 202. The user operates the selection menu to select an arbitrary application, using the operation input or the orientation of the display 202. The image generation unit 101 generates an image based on an output of the selected application as the display image. This enables the user to view the image based on the output of the application.

When receiving another trigger input made by the user, the image generation unit 101 hides the image based on the output of the application and generates the previous icon selection image. By using the launcher, even if all applications cannot be arranged in the respective segments, for example, the user is enabled to select an arbitrary application.

(Notification)

Figure 24:
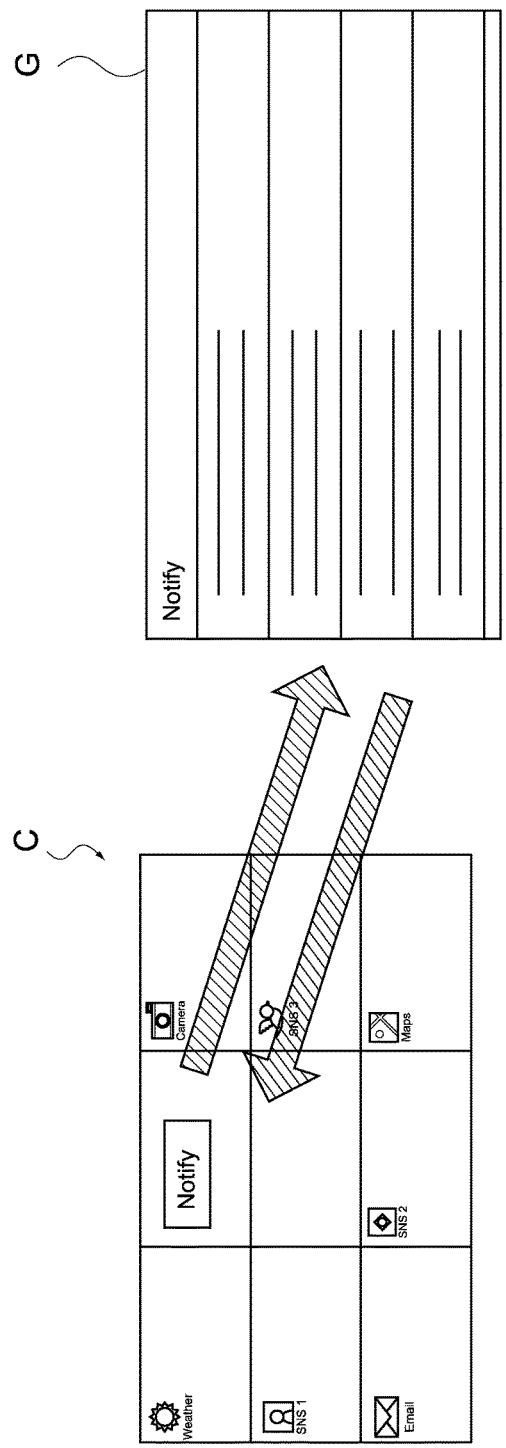
FIG. 24 A schematic diagram showing a usage example of notification by the head head-mounted display system.

As shown in FIG. 24, the object arrangement unit 103 is capable of arranging a notification generated by a particular application in one or more segments as the object. Examples of the notification include incoming mail, posting to a social networking service (SNS), and a schedule notification. By changing the orientation of the display 202, the user can check notifications. In addition, when the user performs the first trigger input in the state in which the user is viewing the notification, the segment selection unit 104 determines the selection of the segment in which that notification is arranged and informs the image generation unit 101 of it.

The image generation unit 101 generates the display image based on the output of the application generated by the notification and supplies it to the display 202. This enables the user to view the image based on the output of the application. When receiving another trigger input made by the user, the image generation unit 101 hides the image based on the output of the application and generates the previous icon selection image. In this manner, the user is enabled to check a notification by the use of the HMD system 100 and use an application that has generated the notification if necessary.

The present technology is not limited only to each of the above-mentioned embodiments and may be changed without departing from the gist of the present technology.

Note that the present technology may also take the following configurations.

(1) A head-mounted display system, including:

a coordinate system setting unit that sets a cylindrical coordinate system partitioned into a plurality of segments in a real space;

a segment selection unit that brings, based on a direction of the display, any of the plurality of segments into a selection stand-by state in the cylindrical coordinate system; and an image generation unit that generates, when the selection of the segment held in the selection stand-by state is determined, a display image to be displayed on the display corresponding to the determined segment.

(2) The head-mounted display system according to (1), in which the segment selection unit acquires, based on the direction of the display, an angle-of-view range occupied by an angle of view of the display in the cylindrical coordinate system, and brings a segment of the plurality of segments, which has a largest area in the angle-of-view range, into the selection stand-by state.

(3) The head-mounted display system according to (1) or (2), in which the segment selection unit acquires, based on the direction of the display, a coordinate located in the direction of the display in the cylindrical coordinate system and brings a segment of the plurality of segments, which includes the coordinate, into the selection stand-by state.

(4) The head-mounted display system according to any one of (1) to (3), in which the segment selection unit receives a first trigger input and determines the selection of the segment held in the selection stand-by state.

(5) The head-mounted display system according to any one of (1) to (4), in which the cylindrical coordinate system sets a vertical direction as a height direction and a horizontal direction as a circumferential direction.

(6) The head-mounted display system according to any one of (1) to (5), in which the coordinate system setting unit receives a second trigger input and moves the cylindrical coordinate system in a height direction of the cylindrical coordinate system.

(7) The head-mounted display system according to any one of (1) to (6), in which the coordinate system setting unit divides the cylindrical coordinate system in a height direction and a circumferential direction of the cylindrical coordinate system, to thereby partition the cylindrical coordinate system into the plurality of segments.

(8) The head-mounted display system according to any one of (1) to (7), in which the coordinate system setting unit divides the cylindrical coordinate system in directions that are oblique to a height direction and a circumferential direction of the cylindrical coordinate system, to thereby partition the cylindrical coordinate system into the plurality of segments.

(9) The head-mounted display system according to any one of (1) to (8), further including an object arrangement unit that arranges an object in each of the plurality of segments, in which the image generation unit generates, corresponding to the angle-of-view range in the cylindrical coordinate system, an image of the object as the display image.

(10) The head-mounted display system according to any one of (1) to (9), in which the segment selection unit does not bring a segment in which the object is not arranged into the selection stand-by state.

(11) The head-mounted display system according to any one of (1) to (10), in which
the object arrangement unit does not arrange the object in a segment of the plurality of segments, which is present in a front direction of the display in the real space.

(12) The head-mounted display system according to any one of (1) to (11), in which
the object is an icon of an application, and
the image generation unit generates, when a selection of a segment in which a particular icon is arranged is determined, the display image based on an output of an application corresponding to the icon.

(13) The head-mounted display system according to any one of (1) to (12), in which
the object is a widget generated by a predetermined application, and
the image generation unit generates, when a selection of a segment in which a particular widget is arranged is determined, the display image based on an output of an application corresponding to the widget.

(14) The head-mounted display system according to any one of (1) to (13), in which
the object is an application launcher, and
the image generation unit generates, when a selection of a segment in which an application launcher is arranged is determined, an image including an application selection menu as the display image.

(15) The head-mounted display system according to any one of (1) to (14), in which
the object is a notification generated by a predetermined application, and
the image generation unit generates, when a selection of a segment in which a particular notification is arranged is determined, the display image based on an output of the application that generates the notification.

(16) The head-mounted display system according to any one of (1) to (15), in which
the display is a see-through-type display.

(17) A head-mounted display, including:
a coordinate system setting unit that sets a cylindrical coordinate system partitioned into a plurality of segments in a real space;
a segment selection unit that brings, based on a direction of the display, any of the plurality of segments into a selection stand-by state in the cylindrical coordinate system; and
an image generation unit that generates, when the selection of the segment held in the selection stand-by state is determined, a display image to be displayed on the display corresponding to the determined segment.

(18) A head-mounted display control program that causes a computer to function as:
a coordinate system setting unit that sets a cylindrical coordinate system partitioned into a plurality of segments in a real space;
a segment selection unit that brings, based on a direction of the display, any of the plurality of segments into a selection stand-by state in the cylindrical coordinate system; and
an image generation unit that generates, when the selection of the segment held in the selection stand-by state is determined, a display image to be displayed on the display corresponding to the determined segment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DESCRIPTION OF REFERENCE NUMERALS 100 head-mounted display system
101 image generation unit
102 coordinate system setting unit
103 object arrangement unit
104 segment selection unit
200 head-mounted display
300 information processing apparatus

The invention claimed is:

1. A head-mounted display system, comprising:
a coordinate system setting unit configured to set a cylindrical coordinate system partitioned into a plurality of segments in a real space relative to a direction of a display of the head-mounted display system, each of the plurality of segments having a predetermined height and width;
an object arrangement unit configured to display on the display an object in at least some of the plurality of segments such that different segments include objects;
a segment selection unit configured to select a segment of the plurality of segments, that has been placed in a selection stand-by state, based on a reception of a first trigger input, the placement of the segment into the selection stand-by state based on a location in the cylindrical coordinate system of an angle-of-view range having a predetermined height and width, the angle-of-view range being moveable in the cylindrical coordinate system to correspond to at least some of the plurality of segments with objects, the location of the angle-of-view range in the cylindrical coordinate system corresponding to a direction of the display in the real space and a radius of the cylindrical coordinate system after the cylindrical coordinate system is set, and the segment of the plurality of segments that has been placed in the selection stand-by state is determined by the segment of the plurality of segments having a largest area within the angle-of-view range in comparison with one or more other segments with objects; and
an image generation unit configured to generate, when the selection of the segment in the selection stand-by state is determined, a display image to be displayed on the display corresponding to the determined segment.

2. The head-mounted display system according to claim 1, wherein the segment selection unit is configured to acquire, based on the direction of the display, a coordinate located in the direction of the display in the cylindrical coordinate system and select a segment of the plurality of segments, which includes the coordinate, while held in the selection stand-by state.

3. The head-mounted display system according to claim 1, wherein the cylindrical coordinate system has a vertical direction as a height direction and a horizontal direction as a circumferential direction.

4. The head-mounted display system according to claim 1, wherein the coordinate system setting unit is configured to receive a second trigger input and move the cylindrical coordinate system in a height direction of the cylindrical coordinate system.

5. The head-mounted display system according to claim 1, wherein the coordinate system setting unit is configured to divide the cylindrical coordinate system in a height direction and a circumferential direction of the cylindrical coordinate system, to thereby partition the cylindrical coordinate system into the plurality of segments.

6. The head-mounted display system according to claim 1, wherein the coordinate system setting unit is configured to divide the cylindrical coordinate system in directions that are oblique to a height direction and a circumferential direction of the cylindrical coordinate system, to thereby partition the cylindrical coordinate system into the plurality of segments.

7. The head-mounted display system according to claim 1, wherein the image generation unit is configured to generate an image of the object as the display image.

8. The head-mounted display system according to claim 1, wherein the segment selection unit is configured to not select a segment in which the object is not provided in the segment.

9. The head-mounted display system according to claim 1, wherein the object arrangement unit is configured to not provide the object in a segment of the plurality of segments, which is present in a front direction of the display in the real space.

10. The head-mounted display system according to claim 1, wherein the object is an icon of an application, and wherein the image generation unit is configured to generate the display image based on an output of an application corresponding to the icon.

11. The head-mounted display system according to claim 1, wherein the object is a widget generated by a predetermined application, and wherein the image generation unit is configured to generate the display image based on an output of an application corresponding to the widget.

12. The head-mounted display system according to claim 1, wherein the object is an application launcher, and wherein the image generation unit is configured to generate an image including an application selection menu as the display image.

13. The head-mounted display system according to claim 1, wherein the object is a notification generated by a predetermined application, and the image generation unit is configured to generate the display image based on an output of the predetermined application.

14. The head-mounted display system according to claim 1, wherein the display is a see-through-type display.

15. The head-mounted display system according to claim 1, wherein the segment selection unit is configured to highlight the segment having the largest area corresponding to the angle-of-view range when the segment is in the selection stand-by state.

16. The head-mounted display system according to claim 1, wherein the image generation unit is configured to replace the plurality of segments with the display image when the display image is displayed.

17. A head-mounted display, comprising:
a coordinate system setting unit configured to set a cylindrical coordinate system partitioned into a plurality of segments in a real space relative to a direction of a display of the head-mounted display system, each of the plurality of segments having a predetermined height and width;
an object arrangement unit configured to display on the display an object in at least some of the plurality of segments such that different segments include objects;
a segment selection unit configured to select a segment of the plurality of segments, that has been placed in a selection stand-by state, based on a reception of a first trigger input, the placement of the segment into the selection stand-by state based on a location in the cylindrical coordinate system of an angle-of-view range having a predetermined height and width, the angle-of-view range being moveable in the cylindrical coordinate system to correspond to at least some of the plurality of segments with objects, the location of the angle-of-view range in the cylindrical coordinate system corresponding to a direction of the display in the real space and a radius of the cylindrical coordinate system after the cylindrical coordinate system is set, and the segment of the plurality of segments that has been placed in the selection stand-by state is determined by the segment of the plurality of segments having a largest area within the angle-of-view range in comparison with one or more other segments with objects; and
an image generation unit configured to generate, when the selection of the segment in the selection stand-by state is determined, a display image to be displayed on the display corresponding to the determined segment.

18. A non-transitory computer readable storage medium storing a head-mounted display control program that causes a computer to function as:
a coordinate system setting unit configured to set a cylindrical coordinate system partitioned into a plurality of segments in a real space relative to a direction of a display of the head-mounted display system, each of the plurality of segments having a predetermined height and width;
an object arrangement unit configured to display on the display an object in at least some of the plurality of segments such that different segments include objects;
a segment selection unit configured to select a segment of the plurality of segments, that has been placed in a selection stand-by state, based on a reception of a first trigger input, the placement of the segment into the selection stand-by state based on a location in the cylindrical coordinate system of an angle-of-view range having a predetermined height and width, the angle-of-view range being moveable in the cylindrical coordinate system to correspond to at least some of the plurality of segments with objects, the location of the angle-of-view range in the cylindrical coordinate system corresponding to a direction of the display in the real space and a radius of the cylindrical coordinate system after the cylindrical coordinate system is set, and the segment of the plurality of segments that has been placed in the selection stand-by state is determined by the segment of the plurality of segments having a largest area within the angle-of-view range in comparison with one or more other segments with objects; and
an image generation unit configured to generate, when the selection of the segment in the selection stand-by state is determined, a display image to be displayed on the display corresponding to the determined segment.

* * * * *